US010079678B2

(12) United States Patent
Smith et al.

(10) Patent No.: US 10,079,678 B2
(45) Date of Patent: Sep. 18, 2018

(54) PROVIDING ACCESS TO ENCRYPTED DATA

(75) Inventors: Ned M. Smith, Hillsboro, OR (US);
George W. Cox, Lake Oswego, OR (US); David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 13/557,079

(22) Filed: Jul. 24, 2012

(65) Prior Publication Data

US 2014/0032933 A1    Jan. 30, 2014

(51) Int. Cl.
| G06F 12/14 | (2006.01) |
|---|---|
| H04L 9/08 | (2006.01) |
| H04L 9/32 | (2006.01) |
| G06F 21/62 | (2013.01) |
| G06F 21/31 | (2013.01) |
| G06F 21/74 | (2013.01) |

(52) U.S. Cl.
CPC ............ *H04L 9/0866* (2013.01); *G06F 21/31* (2013.01); *G06F 21/6209* (2013.01); *H04L 9/0822* (2013.01); *H04L 9/3226* (2013.01); *G06F 21/74* (2013.01); *G06F 2221/2107* (2013.01)

(58) Field of Classification Search
CPC .................................................... H04L 9/0866
USPC ......................................................... 713/193
See application file for complete search history.

(56) References Cited

U.S. PATENT DOCUMENTS

| 2006/0075230 | A1 | 4/2006 | Baird et al. |
|---|---|---|---|
| 2008/0059804 | A1 | 3/2008 | Shah et al. |
| 2008/0279373 | A1 | 11/2008 | Erhart et al. |
| 2008/0294914 | A1 | 11/2008 | Lee et al. |
| 2009/0031408 | A1* | 1/2009 | Thom et al. ...................... 726/9 |
| 2009/0083833 | A1* | 3/2009 | Ziola ...................... G06F 21/31 726/2 |

(Continued)

FOREIGN PATENT DOCUMENTS

| JP | 2010191946 A | 9/2010 |
|---|---|---|
| WO | WO 2008065596 A1 * | 6/2008 |

(Continued)

OTHER PUBLICATIONS

Edward Suh et al. "Aegis: A Single-chip Secure Processor," IEEE Design & Test of Computers, 2007, pp. 570-580.*

(Continued)

*Primary Examiner* — Luu Pham
*Assistant Examiner* — Canh Le
(74) *Attorney, Agent, or Firm* — Schwabe, Williamson & Wyatt, P.C.

(57) ABSTRACT

Embodiments of methods, systems, and storage medium associated with providing access to encrypted data for authorized users are disclosed herein. In one instance, the method may include obtaining a derived value for an authenticated user based on user personalization data of the authenticated user, and generating a user-specific encryption key based on the derived value. The derived value may have entropy in excess of a predetermined level. The user-specific encryption key may enable the authenticated user to access the encrypted data stored at the storage device. Other embodiments may be described and/or claimed.

20 Claims, 4 Drawing Sheets

(56) References Cited

U.S. PATENT DOCUMENTS

| | | | | |
|---|---|---|---|---|
| 2009/0254981 | A1* | 10/2009 | Devadas | G06F 21/31 |
| | | | | 726/5 |
| 2011/0002461 | A1* | 1/2011 | Erhart | H04L 9/302 |
| | | | | 380/44 |
| 2012/0011364 | A1* | 1/2012 | Rubin | 713/168 |
| 2012/0011565 | A1* | 1/2012 | Garlie et al. | 726/2 |
| 2013/0142329 | A1* | 6/2013 | Bell | H04L 9/0866 |
| | | | | 380/44 |

FOREIGN PATENT DOCUMENTS

| | | | |
|---|---|---|---|
| WO | WO2009013673 | A2 | 1/2009 |
| WO | WO 2011-089143 | A1 | 7/2011 |
| WO | WO2011089143 | A1 | 7/2011 |

OTHER PUBLICATIONS

Ruby B. Lee et al. "Architecture for Protecting Critical Secrets in Microprocessors," IEEE, 2005, pp. 1-12.*

International Search Report and Written Opinion dated Oct. 28, 2013 for International Application No. PCT/US2013/051009, 13 pages.

Intel Corporation, "3rd Generation Intel® Core™ vPro™ Processors", www.intel.com/vPro, 4 pages, retrieved on Jul. 24, 2012.

Utimaco Safeware AG, "The two sites of Utimaco", www.utimaco.com, 2 pages, retrieved on Jul. 24, 2012.

Symantec Corporation, "Symantec Encryption", www.pgp.com, 5 pages, retrieved on Jul. 24, 2012.

Wave Sytems Corp., www.wave.com, 1 page, retrieved on Jul. 24, 2012.

Notice of Reasons for Rejection dated Jul. 21, 2011, from Japanese Patent Application No. 2009-293557.

International Preliminary Report on Patentability dated Feb. 5, 2015 for International Application No. PCT/US2013/051009, 9 pages.

Extended European Search Report dated Feb. 16, 21016 for European Patent Application No. 13822709.5, 8 pages.

Office Action dated Oct. 8, 2016 for Chinese Patent Application No. 201380004547.2, 26 pages.

Office Action dated Nov. 1, 2017 for Chinese Patent Application No. 201380004547.2, 24 pages.

Office Action dated May 14, 2018 for Chinese Patent Application No. 201380004547.2, 7 pages.

* cited by examiner

PROVIDING ACCESS TO ENCRYPTED DATA

FIELD

Embodiments of the present disclosure generally relate to the field of data processing, and more particularly, to techniques for facilitating access to encrypted data for authorized users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Full-disk encryption (FDE) solutions have been developed that are supposed to protect against hacker attackers that may be in physical possession of an encrypted disk drive or a platform that may house such a disk drive. Current solutions typically require the cryptography protecting the stored data being able to prevent brute force attacks for a considerable period of time, e.g., 7-10 years. Consequently, the source of entropy for an encryption key that may be used for cryptography techniques may be required to be very strong so that it may not be reverse-engineered by the attacker. To address these requirements, FDE vendors often require the user to enter a very long password or passphrase. However, it may be difficult for a user to memorize and reproduce such passwords or passphrases. Furthermore, a user may find a long password or passphrase difficult to type, which may decrease user productivity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for facilitating access to encrypted data to authorized (e.g., authenticated) users. The described techniques may allow for a user-friendly authentication process that allows for secure data protection. The described techniques may employ physically unclonable function technology as a platform entropy source that resists tampering. This approach may avoid using long user-provided passwords or passphrases as an entropy source for data encryption key derivation. Accordingly, a user may not need to memorize or reproduce a long password or passphrase that typically provide a desired level of entropy. User experience utilizing the described authentication techniques may be similar to traditional, simple sign-in or login procedures that use short passwords, biometric or token-based authentication methods.

In embodiments, a user may authenticate with a system configured to provide access to encrypted data to authorized user. If authentication is successful, the system may retrieve personalization information associated with the authenticated user (e.g., a particular data string such as a password or other type of data) from a user profile stored with or accessible to the system. The retrieved personalization information may be included in the data encryption key derivation to particularize the derived encryption key to that user on that platform, so that only authorized users' access to encrypted data may be enforced.

Figure 1:
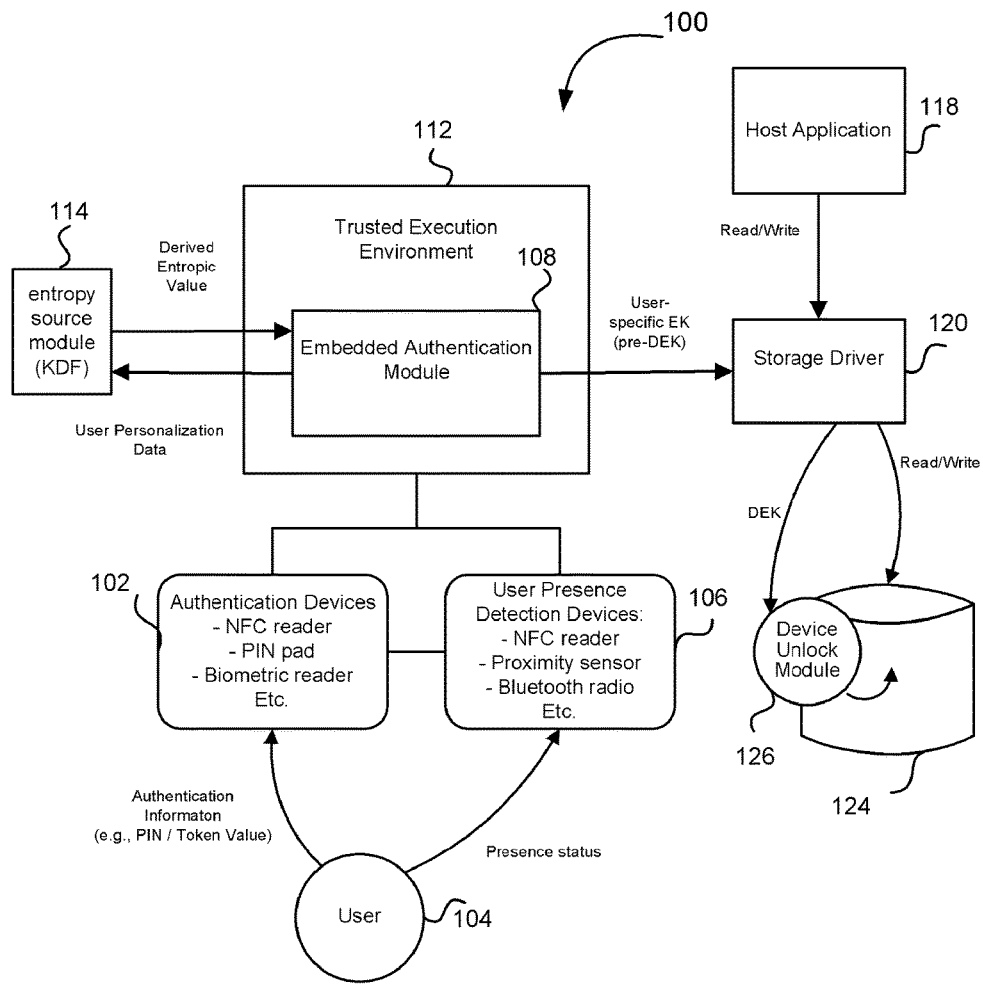
FIG. 1 illustrates an example block diagram of an environment in which authorized users may be provided access to encrypted data in accordance with various embodiments.

FIG. 1 is a block diagram of an example system 100 suitable for providing user-friendly authentication to access encrypted storage media in accordance with some embodiments. The storage media may be magnetic, optical, or solid state storage device, or other storage devices of the like. The system 100 is not limited to the system components described herein; other suitable configurations of the device using different components may be used without departing from the spirit of the present disclosure. For example, the system 100 may reside on one or more server devices or be at least in part distributed among different computing devices. For ease of understanding, the system 100 components may be described as residing on one or more computing devices.

In various embodiments, the system 100 may include a number of components (modules) that may be co-located and connected with each other via system buses, such as Peripheral Component Interconnect (PCI) bus, Universal Serial Bus (USB), and so forth, or distributed and remotely connected with each other via wired or wireless connections, e.g., a network such as Internet or any other type of network, such as local area network (LAN), wide area network (WAN), Wi-Fi (in accordance with one of IEEE 902.11 standard), and the like. (IEEE=institute of Electrical and Electronic Engineers.) In one example, the system 100 may include one or more authentication devices 102 configured to authenticate a user 104 with the system 100. The authentication devices 102 may include, but are not limited to, near field communication (NFC) readers, biometric readers, (personal identification number) PIN pads, and the like. In another embodiment, the authentication devices 102 may be configured to provide login procedures associated with user access to a computing system or an application (e.g., the user 104 may authenticate using a password or passphrase associated with the system 100). The system 100 may further include user presence detection devices 106, such as proximity sensors, NFC readers, Bluetooth® radio and the like. Using the user presence detection devices 106, the system 100 may detect a presence of the user 104 and prepare authentication devices 102 for user authentication.

The authentication devices 102 may be associated with an embedded authentication module 108. The embedded authentication module 108 may reside or operate in, e.g., a trusted execution environment (TEE) 112. An example TEE 112 may include a manageability engine (ME) or a converged security engine (CSE), which may be a general purpose microcontroller in the chipset. The TEE 112 may also refer to a mode of a Central Processing Unit (CPU), e.g., the Secure Enclaves® mode where a portion of the user's process is protected from reads/writes by other processes and the kernel. In another example, the TEE 112 may include a CPU mode called Trust Zone® utilized in Acorn RISC Machine (ARM) architecture. Generally, the TEE 112 may refer to any secure execution environment associated with a computer system such as system 100.

The embedded authentication module 108 may be configured to implement embedded multifactor authentication where the user may perform authentication only once, and be provided with access to all the platform resources and services available with the system 100, for as long as the current session is active. The embedded authentication module 108, in embodiments, may have access to locally or remotely stored user records including user profile information. The user profile information may include user-specific data (e.g., login and password) for each user that the embedded authentication module 108 may be able to authenticate. The user profile information may also specify policies for a type of multi-factor authentication that may be applied. In an embodiment, the user profile information may be encrypted by a chipset storage key. The embedded authentication module 108 may have an associated storage key that may be derived from the chipset storage key. The user profiles may be additionally specific to the system 100.

Thus, the user 104 may be authenticated with the embedded authentication module 108 using authentication devices 102 with or without usage of user presence sensor detection devices 106. In embodiments, the embedded authentication module 108 may provide user personalization data to an entropy source module 114. The user personalization data may include a unique identifier associated with the user profile information, such as a globally unique identifier (GUID) for a specific user account. The user personalization data may include a user-supplied alias string that may identify the user account and/or user profile information. In summary, the user personalization data may include any information associated with the user profile accessible by the embedded authentication module 108 in order to ensure that a derived key is unique to the computing environment described herein.

The entropy source module 114, in embodiments, may comprise an entropy device implementing a physical unclonable function (PUF) based on a challenge-response authentication. When a physical stimulus (e.g., electric impulse) is applied to the PUF structure, it may react in an unpredictable way due to the complex interaction of the stimulus with the physical microstructure of the device. This exact microstructure may depend on physical factors introduced during manufacture which may be unpredictable. Accordingly, the entropy source module 114 may comprise a tamper-resistant chip configured to produce a number of random values having a high-entropy derived value, that is a derived value having entropy deemed to be in excess of a predetermined design point.

An attacker with physical possession of the PUF device such as the entropy source module 114 may not be able to observe the PUF random values unless the chip remains powered while the attacker physically inspects the PUF device, which would damage the chip rendering the entropy source inoperable.

In various embodiments, the entropy source module 114 may be configured to implement a key derivation function (KDF). A KDF may be implemented as a message authentication code algorithm (MAC) such as a Hash-based Message Authentication Code (HMAC) algorithm, Cipher-based Message Authentication Code (CMAC) algorithm, or the like. In an embodiment, the KDF may use user personalization data as at least one input parameter. The entropy source module 114 may produce a derived entropic value (DEV) based at least in part on user personalization data provided by the embedded authentication module 108. There may two interfaces to the entropy source module. One interface may behave like a KDF and another interface may behave like a random number generator (RNG). The DEB value may be used for deriving data encryption keys need to access encrypted data. Typically, FDE solutions use a symmetric data encryption key (DEK) used to encrypt/decrypt data stored at a storage device (hard disk drive) or the data traffic, e.g., flowing through a computer bus interface (such as Serial AT Attachment or SATA) between host bus adapters and hard disk drives. There may be multiple users of a particular computing platform that need to access the same disk drive or partition. Accordingly, for each authenticated user, the embedded authentication module 108, based on the stored user information and/or derived entropic value DEV, may derive a user-specific encryption key (pre-DEK) and pass the derived pre-DEK to a storage driver 120.

Generally, the DEK may be generated once, for example, when the decision to encrypt the storage device is made. Then the pre-DEK may be derived to wrap the DEK. Each existing user may have a different pre-DEK derived which wraps the same DEK. An administrator user may be assigned to the system that may have the right to allow subsequent new users to gain access to the DEK without requiring peer cooperation. Wrapped DEK blobs may be stored in unencrypted storage such as, for example, the system flash memory, on an unencrypted partition of a hard drive, or the like.

Using a user-specific pre-DEK to calculate the DEK may allow authorized (authenticated) users to access encrypted data (e.g., encrypted data stored on a mass storage device). In one example, the derived entropic value DEV may be provided to the embedded authentication module 108 to produce a pre-DEK. The storage driver 120 may be configured to calculate a disk encryption key DEK based on a user-specific pre-DEK in order to provide access to encrypted data to the authenticated user. The examples of calculating a DEK based on a user-specific pre-DEK will be described in more detail in reference to FIG. 3.

The generated DEK may be passed on to a storage device 124. In an embodiment, a device unlock module 126 may use the generated DEK to "unlock" (i.e., decrypt) the data stored at the storage device 124, thus allowing a host application 118 that may be launched by authenticated user or by an internal resource to access the encrypted data stored at the storage device 124, for example to conduct "read" and "write" operations with the storage device 124. In embodiments, as described earlier, storage device 124 may be any one of a magnetic, optical or solid state drive. In alternate embodiments, storage device 124 may be static or dynamic random access memory, flash memory or other memory of the like.

In some embodiments, using the access to data techniques described herein, different authorized users may have access to different portions of data stored at the storage device 124. For example, each authorized user may have access to one or more partitions (e.g., logical storage units) of the storage device 124. For example, authorized user A may have access to partition A of the storage device 124, while user B may have access to partition B of the storage device 124. In this example, user A may not have access to partition B and user B may not have access to partition A.

Figure 2:
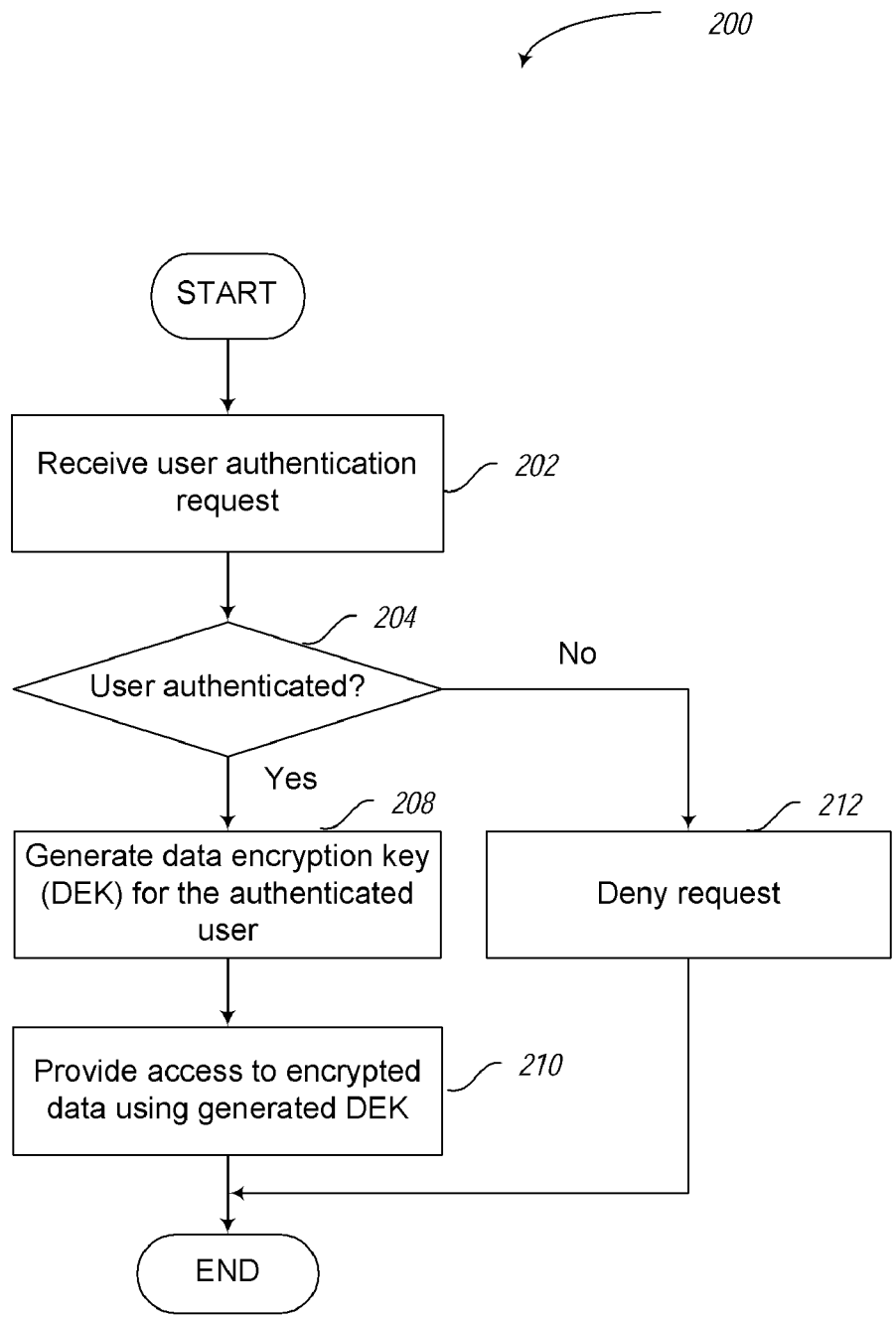
FIG. 2 illustrates a process flow diagram for providing access to encrypted data in accordance with various embodiments.

FIG. 2 illustrates a process flow diagram for providing access to encrypted data described in reference to FIG. 1 in accordance with various embodiments. In some embodiments, once the user is authenticated, she may get access to encrypted data using the pre-DEK derived at authentication whenever she requests access to the data during the remainder of the current session. For example, a user-specific pre-DEK may be derived once for an authenticated user and may be used every time authenticated user needs to access encrypted data during the current session. In some embodiments, a user-specific pre-DEK may be derived every time an authenticated user wants to access encrypted data, even within the same session.

The process 200 may begin at block 202, where user request to authenticate with the computing system described in reference to FIG. 1 may be received, e.g., by the embedded authentication module 108 via authentication devices 102. The authentication request may be issued in relation to accessing encrypted data that may reside on a storage device (e.g., 124). The user authentication request may include user-specific authentication information, such as login and password that may be required to authenticate a user.

At decision block 204, the embedded authentication module 108 may determine whether the user is authenticated with the system successfully. For example, it may be determined that the user authentication information matches the user profile information stored with the system as described above. If at decision block 204 it is determined that user authentication is not successful, the process 200 may move to block 212, where user request to access encrypted data may be denied.

If at decision block 204 it is determined that the user authentication is successful the process 200 may move to block 208, where a data encryption key (DEK) may be generated for the authenticated user as described in reference to FIG. 1. For example, the DEK may be generated based at least in part on user personalization data in order to derive a user-specific encryption key (pre-DEK), e.g., using a KDF interface of the entropy source module 114 so as to ensure high level of data protection and at the same time provide access to encrypted data only to authorized (e.g., authenticated) users. It should be noted that the process 200 may illustrate a setup process or a user login process. In a login scenario, the DEK may not necessarily be generated each time the user logs in the system.

At block 210, the authorized user may be provided access to the encrypted data. As described above in reference to FIG. 1, the encrypted data stored, for example, at a storage device 124 may be "unlocked" using the DEK so that the user or an application launched by the user (e.g. host application 118) may have access to the data, such as access to read and write on the storage device 124. In embodiments, the access may be provided for the current request, or for the remainder of the current session.

Figure 3:
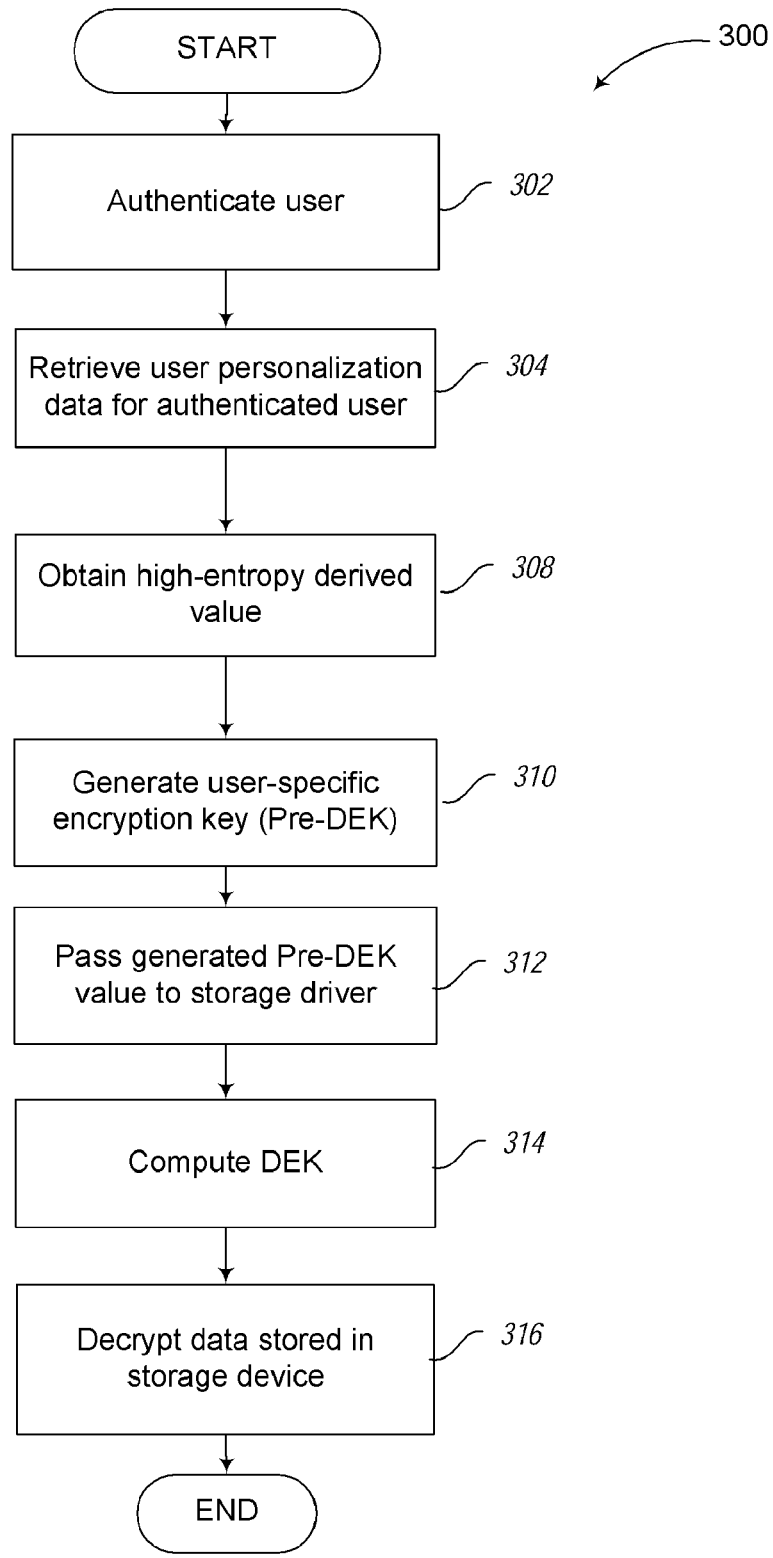
FIG. 3 illustrates a process flow diagram for providing access to encrypted data for authorized users in accordance with various embodiments.

FIG. 3 is a process flow diagram for illustrating providing access to encrypted data for authorized users in more detail in accordance with various embodiments.

The process 300 may begin at block 302, where a user may be authenticated with the system for providing access to encrypted data for authorized users, as described above in reference to FIGS. 1 and 2. At block 304, the user personalization data may be retrieved for the authenticated user from the user profile information stored by the system. As described above, the user personalization data may include a unique identifier associated with the user profile information stored by the system, such as a globally unique identifier (GUID) for the specific user account. The user personalization data may include a user-supplied alias string that may identify the user account or user profile information or any other information associated with the user profile.

At block 308, a high entropy derived value having entropy in excess of a predetermined design point may be obtained, for example, from an entropy source module 114. As described above, the high entropy derived value (DEV) may be obtained using user personalization data as one of input parameters for the KDF. At block 310, a user-specific encryption key pre-DEK may be generated based on the high entropy derived value. The obtaining of DEV and generating the pre-DEK may be accomplished in different ways. In general, it may be beneficial from the process security standpoint to provide "personalization" of the user-specific encryption key generation (i.e., using the user personalization data in the pre-DEK generation) as early in the process 300 as possible. Adding personalization sooner may have the benefit of the KDF function being protected by more hardened hardware execution environment (e.g., TEE described above in reference to FIG. 1). However, adding personalization early in the process of providing access to encrypted data to authorized users may be implemented at the cost of flexibility of the process 300.

One example of providing personalization early in the process may be a two-step process. First, a DEV value may be computed by the entropy source module 114 using a KDF function. Second, the embedded authentication module 108 may compute, using the entropy source module 114, a second derivation Pre-DEK=DEV'=KDF (DEV, "User_X"), where User_X is personalization data that may be derived from authentication information or other user profile information.

Another example of providing personalization early in the process illustrates the instance where different usages may require different keys that may be derived from a common user specific key. For example, there may be user-specific usages related to data access, email access, different application access, and so forth. Accordingly, multiple KDFs may occur in sequence in order to generate a Pre-DEK necessary for accessing the encrypted data. More specifically, there may be a two-step process of derivation, first one for deriving a user specific key and a second one for deriving a usage specific key for that user (e.g., FDE-specific usage), such as:

1. DEV=UserKey=KDF (entropic_value, "User_X"); and
2. Pre-DEK=UsageKey=KDF (UserKey, "FDE_Usage"), where entropic value may be a value derived from the entropy source module 114, User_X may be user personalization data, and FDE Usage may be a value determining a particular usage of the Pre-DEK (e.g., FDE-specific usage).

Returning to process 300, at block 312 the generated Pre-DEK value may be passed on to the storage driver 120, where a DEK for "unlocking" decrypted data may be computed as indicated by block 314. There may be different ways for obtaining the "clear-text" DEK. In one example, the wrapped DEK blob may be wrapped by User_X-pre-DEK and User_X-pre-DEK are both delivered to the self-encrypting drive where the storage driver 120 may unwrap the DEK for use. The DEK value does not exist outside of the drive and therefore no attacker may access the DEK. The system may be enabled to support an admin role where new users may obtain a wrapped copy of the DEK. In another example, the storage driver 120 may perform the DEK unwrap operation, e.g., using User_X-pre-DEK. The "clear-text" DEK may be used within the storage driver 120 to encrypt/decrypt the data stream. This approach may be useful for traditional hard drives. Obtaining the "clear-text" DEK is the "unlock" operation described above in reference to FIG. 1. At block 316, the data stored at the storage device 124 may be decrypted, thus providing user access to the data.

It should be noted that the embedded authentication module 108 may be used to simplify and harden the FDE usage by moving functionality that may be traditionally associated with the storage driver 120 or host application 118 into the embedded authentication module 108. For example, instead of passing pre-DEK to the storage driver 120 where storage driver 120 is configured to manage multiple user keys and select the most appropriate one to compute the DEK, the embedded authentication module may be configured to perform these functions. That is, the embedded authentication module 108 may be configured to compute and utilize UsageKey so as to directly supply the DEK that is used to directly encrypt/decrypt the storage device 124. In this mode, the embedded authentication module 108 may supply the DEK securely to the storage device 124, e.g., using a secure channel protocol such as Transport Layer Security (TLS) or signed-Diffie-Hellman. Generally, the described techniques allow for moving more functionality associated with applications and the storage driver into trusted execution environment.

Figure 4:
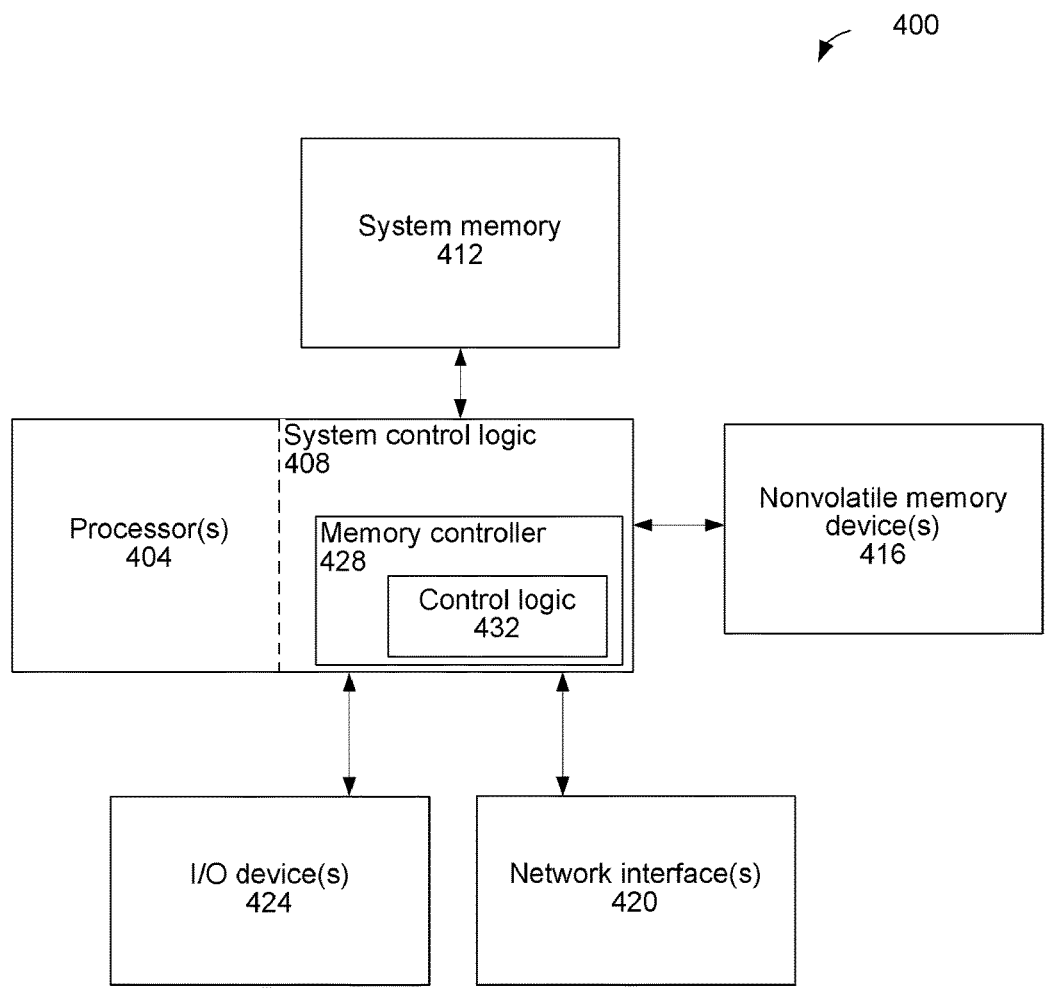
FIG. 4 illustrates a system configured to implement conditional pre-programming and erasure of partially programmed nonvolatile memory devices in accordance with some embodiments.

FIG. 4 illustrates an example system 400 suitable for implementing aspects of providing user access to encrypted data described herein in accordance with various embodiments. Embodiments of the present disclosure may be implemented into a system using any suitable hardware and/or software to configure as desired. An example system 400 comprises processor(s) 404, system control logic 408 coupled to, or integrated with, at least one of the processor(s) 404, system memory 412 coupled to system control logic 408, nonvolatile memory device(s) 416 coupled to system control logic 408, network interface(s) 420 coupled to system control logic 408, and input/output device(s) 424 coupled to system control logic 408.

The processor(s) 404 may include one or more single-core or multi-core processors. The processor(s) 404 may include any combination of general-purpose processors and dedicated processors (e.g., graphics processors, application processors, etc.). Applications, operating systems, etc., executing on the processor(s) 404 may be similar to host application 118 and may issue the memory access requests directed to the nonvolatile memory device(s) 416 similar to the storage device 124 described above with respect to FIG. 1.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s), e.g., memory controller 428, to provide an interface to system memory 412 and nonvolatile memory device(s) 416. System memory 412 may be used to load and store data and/or instructions, for example, for system 400. System memory 412 for one embodiment may include any suitable volatile memory, such as suitable dynamic random access memory (DRAM), for example.

The nonvolatile memory device(s) 416 may include one or more tangible, non-transitory computer-readable media used to store data and/or instructions, for example. The nonvolatile memory device(s) 416 may include nonvolatile memory that may be implemented in, for example, a solid state drive (SSD). The nonvolatile memory device(s) 416 may further include any suitable nonvolatile storage device(s), such as one or more hard disk drive(s) (HDD(s)), compact disk (CD) drive(s), and/or digital versatile disk (DVD) drive(s), for example.

The nonvolatile memory device(s) 416 may include a storage resource physically part of a device on which the system 400 is installed or it may be accessible by, but not necessarily a part of, the device. For example, a portion of the nonvolatile memory device(s) 416 may be accessed over a network via the network interface(s) 420.

The memory controller 428 may include control logic 432 configured to perform at least some parts of the process the encrypted data access described herein, such as, for example, authenticating a user and/or generating a user-specific data encryption key as described earlier. The control logic 432 may include instructions that are executed by at least one of the processor(s) 404 to perform the described operations.

System control logic 408 for one embodiment may include one or more input/output (I/O) controller(s) to provide an interface to network interface(s) 420 and I/O device(s) 424.

Network interface(s) 420 may provide one or more interface(s) for system 400 to communicate over one or more network(s) and/or with any other suitable device. Network interface(s) 420 may include any suitable hardware and/or firmware. Network interface(s) 420 for one embodiment may include, for example, a network adapter, a wireless network adapter, a telephone modem, and/or a wireless modem. For wireless communications, network interface(s) 420 may use one or more antennas. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The network interface(s) 420 may implement any of a number of wireless standards or protocols, including but not limited to Wi-Fi (IEEE 802.11 family), Worldwide Interoperability for Microwave Access (WiMAX, IEEE 802.16 family), IEEE 802.20, long term evolution (LTE), Evolution Data Optimized (Ev-DO), Evolved High-Speed Packet Access (HSPA+), Evolved High-Speed Downlink Packet Access (HSDPA+), Evolved High-Speed Uplink Packet Access (HSUPA+), Enhanced Data rates for GSM Evolution (EDGE), Global System for Mobile Communications (GSM), General Packet Radio Service (GPRS), Code Division Multiple Access (CDMA), Time Division Multiple Access (TDMA), Digital Enhanced Cordless Telecommunications (DECT), Bluetooth®, and derivatives thereof, as well as any other wireless protocols that are designated as 2G, 3G, 4G, 4G, and beyond.

The system 400 may include a plurality of communication chips (not illustrated) for implementing various aspects of network interfacing. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The system 400 may include a display device, such as, for example, a cathode ray tube (CRT), a liquid crystal display (LCD), a light emitting diode (LED), or other suitable display device. The display device may be a touch screen display supporting touch screen features, and in various one of these embodiments, the I/O controller may include a touchscreen controller. In various embodiments, the display device may be a peripheral device interconnected with the system 400.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic, e.g., control logic 432, for one or more controller(s), e.g., memory controller 428, of system control logic 408 to form a System on Chip (SoC) package.

The I/O device(s) 424 may include user interfaces designed to enable user interaction with the system 400, peripheral component interfaces designed to enable peripheral component interaction with the system 400, and/or sensors designed to determine environmental conditions and/or location information related to the system 400. In various embodiments, the user interfaces could include, but are not limited to, a display, e.g., a liquid crystal display, a touch screen display, etc., a speaker, a microphone, a still camera, a video camera, a flashlight (e.g., a light emitting diode flash), and a keyboard. For embodiments including a display supporting touch screen features, the system 400 may include a touchscreen controller for facilitating control of the display. In various embodiments, the peripheral component interfaces may include, but are not limited to, a nonvolatile memory port, an audio jack, and a power supply interface. In various embodiments, the sensors may include, but are not limited to, a gyro sensor, an accelerometer, a proximity sensor, an ambient light sensor, and a positioning unit. The positioning unit may also be part of, or interact with, the network interface(s) 420 to communicate with components of a positioning network, e.g., a global positioning system (GPS) satellite.

In various embodiments, the system 400 may be any other electronic device that processes data. In various embodiments, the system 400 may be a computing device such as, but not limited to, a laptop computing device, a tablet computing device, a netbook, a desktop computing device, a smartphone, a mobile phone, a personal digital assistant, an ultra mobile personal computing device, a server, a printer, a scanner, a monitor, a set-top box, an entertainment control unit, a digital camera, a portable music player, a digital video recorder, etc. In various embodiments, system 400 may have more or fewer components, and/or different architectures.

According to various embodiments, the present disclosure describes a computing device-readable storage medium having executable instructions for providing access to encrypted data stored thereon that, in response to execution by a computing device, cause the computing device to obtain a derived value for an authenticated user based on user personalization data of the authenticated user, and generate a user-specific encryption key for the authenticated user based on the derived value, wherein the user-specific encryption key enables the authenticated user to access encrypted data stored at a storage device. The derived value may have entropy in excess of a predetermined level.

The executable instructions, in response to execution by the computing device, may further cause the computing device to receive a user authentication request, the user authentication request including user authentication information; authenticate a user based on the user authentication information; and retrieve the user personalization data based on the user authentication information.

The executable instructions, in response to execution by the computing device, may further cause the computing device to calculate a data encryption key based on the user-specific encryption key; and using the calculated data encryption key, decrypt the encrypted data to provide access to the encrypted data.

The executable instructions, in response to execution by the computing device, may further provide the computing device with a storage driver module configured to calculate the data encryption key.

The executable instructions, in response to execution by the computing device, may further provide the computing device with an authentication module configured to authenticate the user within a trusted execution environment of the computing device. The authentication module may be further configured to retrieve the user personalization data from user profile information accessible to the authentication module.

The user personalization data may include a unique identifier associated with the user profile information. The user authentication information may include one of a password or a passphrase.

The executable instructions, in response to execution by the computing device, may further cause the computing device to obtain the derived value at a key derivation function module associated with an entropy source of the computing device. The key derivation function may include a Hash-based Message Authentication Code (HMAC) module. The entropy source may comprise a Physical Unclonable Function (PUF) module. The PUF module may comprise a tamper-resistant chip. The tamper-resistant chip may be configured to produce a plurality of random values comprising the derived value.

The storage device may be a full disk encryption (FDE) device. The encrypted data stored at the storage device is accessed via a host application configured to communicate with the data stored at the storage device.

According to various embodiments, the present disclosure describes a computing device comprising a processor and an authentication module configured to be operated by the processor to obtain a derived value for an authenticated user based on user personalization data of the authenticated user, and generate a user-specific encryption key for the authenticated user based on the derived value, wherein the user-specific encryption key enables the authenticated user associated with the user personalization data to access encrypted data stored at a storage device. The derived value may have entropy in excess of a predetermined level.

The authentication module may be further configured to receive a user authentication request, the user authentication request including user authentication information; authenticate a user based on the user authentication information; and retrieve the user personalization data based on the user authentication information.

The authentication module may be further configured to calculate a data encryption key based on the user-specific encryption key; and, using the calculated data encryption key, decrypt the encrypted data to provide access to the encrypted data. The authentication module may be configured to retrieve the user personalization data from user profile information, the user profile information including the user authentication information. The authentication module may be configured to obtain the high-entropy derived value from a high-entropy source.

According to various embodiments, the present disclosure describes a computer-implemented method comprising obtaining a derived value for an authenticated user based on user personalization data of the authenticated user, and generating a user-specific encryption key based on the derived value, wherein the user-specific encryption key enables an authenticated user associated with the user personalization data to access encrypted data stored at a storage device. The derived value may have entropy in excess of a predetermined level.

The method may further comprise receiving a user authentication request, the user authentication request including user authentication information; authenticating a user based on the user authentication information; and retrieving the user personalization data based on the user authentication information.

The method may further comprise calculating a data encryption key based on the user-specific encryption key; and, using the calculated data encryption key, decrypting the encrypted data to provide access to the encrypted data.

The encrypted data may be stored at a storage device and include multiple portions of data each stored at a respective partition of the storage device. The obtaining a high-entropy derived value based on user personalization data may include deriving the high-entropy derived value from a high-entropy source.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. At least one non-transitory computing device-readable storage medium having executable instructions for providing access to encrypted data that, in response to execution by a computing device, cause the computing device to provide an authentication module to:
  receive a user authentication request, the user authentication request including user authentication information;
  authenticate a user based on the user authentication information;
  in response to authentication of the user, retrieve user personalization data other than the user authentication information;
  obtain an unclonable derived value for an authenticated user, from a key derivation function module of the computing device that is associated with an unclonable entropy source of the computing device, based on the retrieved user personalization data of the authenticated user, wherein the unclonable derived value has entropy in excess of a predetermined level by virtue of the key derivation function module being to generate the unclonable derived value based on both the retrieved user personalization data and an unclonable entropic value obtained from the unclonable entropy source of the computing device; and
  generate a user-specific encryption key for the authenticated user based on the unclonable derived value,
  wherein the user-specific encryption key enables the authenticated user to access encrypted data stored at a storage device.

2. The computing device-readable storage medium of claim 1, wherein the executable instructions, in response to execution by the computing device, further cause the computing device to provide a storage driver to:
  calculate a data encryption key based on the user-specific encryption key; and
  using the calculated data encryption key, decrypt the encrypted data to provide access to the data.

3. The computing device-readable storage medium of claim 1, wherein the authentication module is executed within a trusted execution environment of the computing device.

4. The computing device-readable storage medium of claim 3, wherein the authentication module is further to retrieve the user personalization data from user profile information accessible to the authentication module.

5. The computing device-readable storage medium of claim 4, wherein the user personalization data includes a unique identifier associated with the user profile information.

6. The computing device-readable storage medium of claim 1, wherein the user authentication information includes one of a password or a passphrase.

7. The computing device-readable storage medium of claim 1, wherein the key derivation function module includes a Hash-based Message Authentication Code (HMAC) module.

8. The computing device-readable storage medium of claim 1, wherein the unclonable entropy source comprises a Physical Unclonable Function (PUF) module.

9. The computing device-readable storage medium of claim 8, wherein the PUF module comprises a tamper-resistant chip.

10. The computing device-readable storage medium of claim 9, wherein the tamper-resistant chip is configured to produce a plurality of random values comprising the unclonable derived value.

11. The computing device-readable storage medium of claim 1, wherein the storage device is a full disk encryption (FDE) device.

12. The computing device-readable storage medium of claim 1, wherein the encrypted data stored at the storage device is accessed via a host application configured to communicate with the data stored at the storage device.

13. A computing device comprising:
  a hardware processor;
  a key derivation function module that is associated with a local unclonable entropy source; and
  an authentication module to be executed on the hardware processor to:
    receive a user authentication request, the user authentication request including user authentication information;
    authenticate a user based on the user authentication information;
    in response to authentication of the user, retrieve user personalization data other than the user authentication information;
    obtain an unclonable derived value for an authenticated user, from the key derivation function module, based on the retrieved user personalization data of the authenticated user, wherein the unclonable derived value has entropy in excess of a predetermined level by virtue of the key derivation function module generating the unclonable derived value based on both the retrieved user personalization data and an unclonable entropic value obtained from the local unclonable entropy source; and generate a user-specific encryption key for the authenticated user based on the unclonable derived value, wherein the user-specific encryption key enables the authenticated user associated with the retrieved user personalization data to access encrypted data stored at a storage device.

14. The computing device of claim 13, further comprising a storage driver to:

calculate a data encryption key based on the user-specific encryption key; and using the calculated data encryption key, decrypt the encrypted data to provide access to the data.

15. The computing device of claim 13, wherein the authentication module is to retrieve the user personalization data from user profile information, the user profile information including the user authentication information.

16. The computing device of claim 13, wherein the local unclonable entropy source comprises a Physical Unclonable Function (PUF) module.

17. A computer-implemented method comprising:

under control of one or more computing devices configured with executable instructions, receiving a user authentication request, by an authentication module, the user authentication request including user authentication information;

authenticating, by the authentication module, a user based on the user authentication information;

in response to authentication of the user, retrieving, by the authentication module, user personalization data other than the user authentication information;

obtaining an unclonable derived value for an authenticated user, from a key derivation function module that is associated with a local unclonable entropy source, by the authentication module, based on user personalization data of the authenticated user, wherein the unclonable derived value has entropy in excess of a predetermined level by virtue of the key derivation function module generating the unclonable derived value based on both the user personalization data and an unclonable entropic value obtained from the local unclonable entropy source; and generating, by the authentication module, a user-specific encryption key based on the unclonable derived value, wherein the user-specific encryption key enables an authenticated user associated with the user personalization data to access encrypted data stored at a storage device.

18. The computer-implemented method of claim 17, further comprising:

calculating, by a storage driver, a data encryption key based on the user-specific encryption key; and using, by the storage driver, the calculated data encryption key, decrypting the encrypted data to provide access to the data.

19. The computer-implemented method of claim 18, wherein the encrypted data is stored at a storage device, the encrypted data including multiple portions of data each stored at a respective partition of the storage device.

20. The computer-implemented method of claim 17, wherein obtaining comprises obtaining the unclonable derived value from a key derivation function module that is associated with a Physical Unclonable Function (PUF) module.

* * * * *